US009749488B2

(12) United States Patent
Dandoko et al.

(10) Patent No.: US 9,749,488 B2
(45) Date of Patent: Aug. 29, 2017

(54) IMAGE READING APPARATUS THAT READS BY INTENDED READ SIZE AND IMAGE PROCESSING APPARATUS

(71) Applicant: Kyocera Document Solutions Inc., Osaka (JP)

(72) Inventors: Takushi Dandoko, Osaka (JP); Tetsuya Maeda, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/091,586

(22) Filed: Apr. 6, 2016

(65) Prior Publication Data

US 2016/0295051 A1 Oct. 6, 2016

(30) Foreign Application Priority Data

Apr. 6, 2015 (JP) ................................. 2015-077817

(51) Int. Cl.
*G06F 3/12* (2006.01)
*H04N 1/00* (2006.01)

(52) U.S. Cl.
CPC ....... *H04N 1/00822* (2013.01); *H04N 1/0044* (2013.01); *H04N 1/00411* (2013.01); *H04N 1/00708* (2013.01); *H04N 1/00745* (2013.01); *H04N 1/00824* (2013.01); *H04N 2201/0094* (2013.01)

(58) Field of Classification Search
CPC .......... H04N 1/00822; H04N 1/00411; H04N 1/0044; H04N 1/00745; H04N 1/00824; H04N 1/00708
USPC ...................................................... 358/1.13
See application file for complete search history.

(56) References Cited

U.S. PATENT DOCUMENTS

| 7,509,067 B2 * | 3/2009 | Katahira ............ G03G 15/5016 399/75 |
| 8,508,784 B2 * | 8/2013 | Miyata ............... G03G 15/5095 358/1.13 |
| 2007/0025752 A1 | 2/2007 | Maeda et al. |

* cited by examiner

*Primary Examiner* — Marivelisse Santiago Cordero
*Assistant Examiner* — Neil R McLean
(74) *Attorney, Agent, or Firm* — James Judge

(57) ABSTRACT

An image reading apparatus includes a read size determination circuit. The read size determination circuit has a plurality of operation mode including a first mode and a second mode. The first mode determines the size of the document detected by the first document reading unit as a first read size and determines a read size of the document set in advance as a second read size. The first read size is the read size of the document when the first document reading unit reads the document. The second mode determines the size of the document detected by the first document reading unit as the first read size. If the second document reading unit reads the document, the second mode determines the read size of the document set in the setting screen as the second read size when a start instruction of a reading job is entered using the operation circuit.

7 Claims, 8 Drawing Sheets

IMAGE READING APPARATUS THAT READS BY INTENDED READ SIZE AND IMAGE PROCESSING APPARATUS

INCORPORATION BY REFERENCE

This application is based upon, and claims the benefit of priority from, corresponding Japanese Patent Application No. 2015-077817 filed in the Japan Patent Office on Apr. 6, 2015, the entire contents of which are incorporated herein by reference.

BACKGROUND

Unless otherwise indicated herein, the description in this section is not prior art to the claims in this application and is not admitted to be prior art by inclusion in this section.

There is known an image reading apparatus that can read a document by two kinds of methods: the method that reads a document placed on a platen constituted of a transparent member such as glass; and the method that reads a document by conveying the document, which is placed on a document placement table, to the platen. There is known a technique that, by locating a sensor that detects a size of a document placed, for example, on a platen and a document placement table, determines the size of the document detected by the sensor as a read size of the document when a user has not operated to determine the read size (the size of the document to be read) of the document.

SUMMARY

An image reading apparatus according to one aspect of the disclosure includes a display, an operation circuit, a first document reading unit, a second document reading unit, and a read size determination circuit. The first document reading unit detects a size of a document. The second document reading unit is configured not to detect the size of the document. The read size determination circuit has a plurality of operation mode including a first mode and a second mode. The first mode determines the size of the document detected by the first document reading unit as a first read size and determines a read size of the document set in advance as a second read size. The first read size is the read size of the document when the first document reading unit reads the document. The second read size is the read size of the document when the second document reading unit reads the document. The second mode determines the size of the document detected by the first document reading unit as the first read size. If the second document reading unit reads the document, the second mode displays a setting screen for the read size of the document in the display and determines the read size of the document set in the setting screen as the second read size when a start instruction of a reading job is entered using the operation circuit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
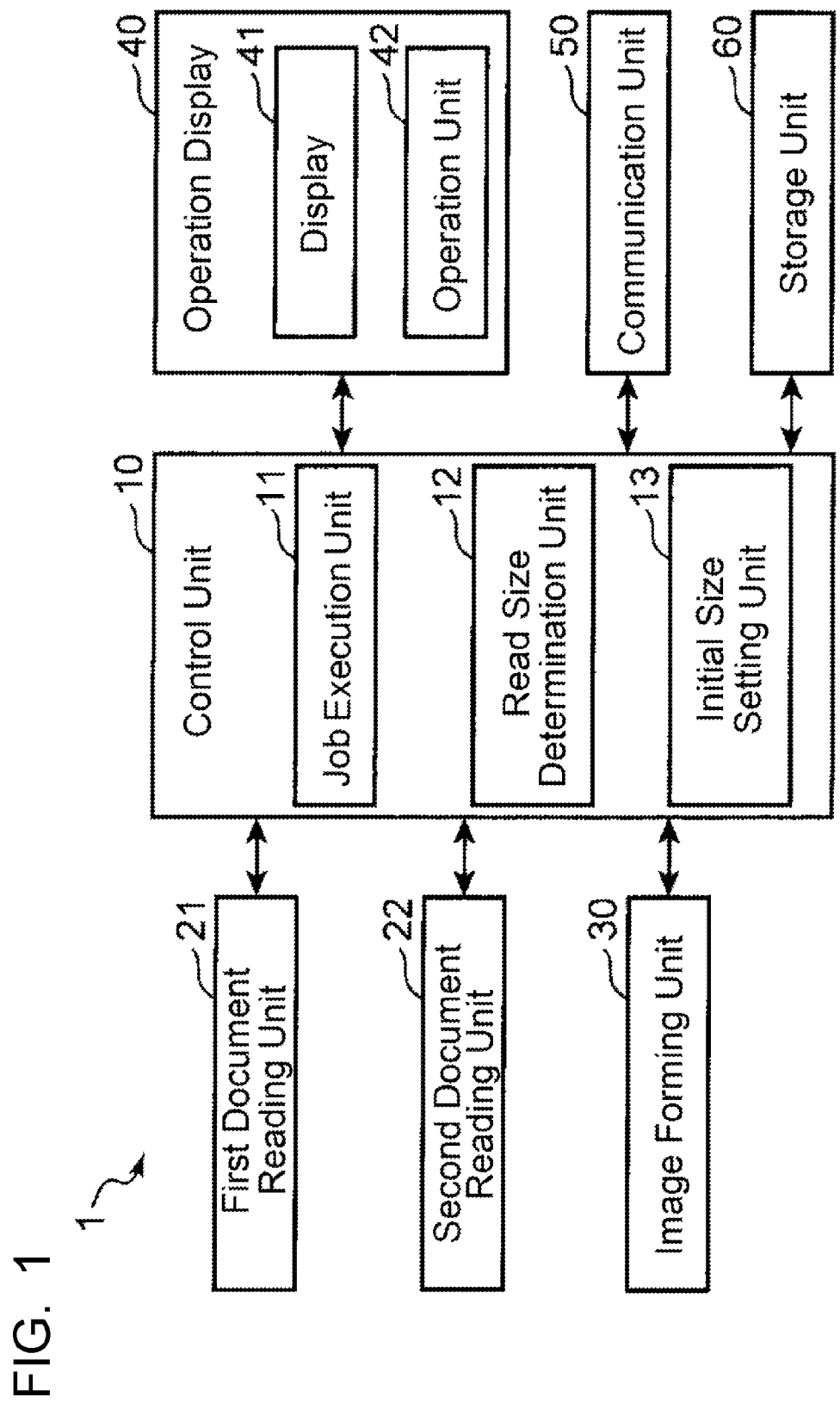
FIG. 1 illustrates an electrical configuration of a multi-functional peripheral.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of an image reading apparatus according to the disclosure and an image processing apparatus that includes this image reading apparatus based on the attached drawings. Although a multi-functional peripheral will be described for an example as the image processing apparatus in this embodiment, the image processing apparatus according to the disclosure is not meant to be limited to this. The image processing apparatus according to the disclosure may be, for example, a facsimile device, a copying machine, a printer or similar device.

FIG. 1 illustrates an electrical configuration of a multi-functional peripheral 1. As illustrated in FIG. 1, the multi-functional peripheral 1 includes a first document reading unit 21, a second document reading unit 22, an image forming unit 30 (an image output unit), an operation display 40, a communication unit 50, a storage unit 60, and a control unit 10. The first document reading unit 21, the second document reading unit 22, the operation display 40, and the control unit 10 constitute an exemplary image reading apparatus according to the disclosure.

While conveying a document placed on a document placement table, the first document reading unit 21 reads the document in its course of conveyance and generates image data that indicates an image of this document. The first document reading unit 21 is configured to be capable of detecting a size of the document placed on the document placement table.

The second document reading unit 22 reads a document placed on a platen constituted of a transparent member such as glass and generates image data that indicates an image of this document. The second document reading unit 22 is configured to be incapable of detecting a size of the document placed on the platen.

Figure 2:
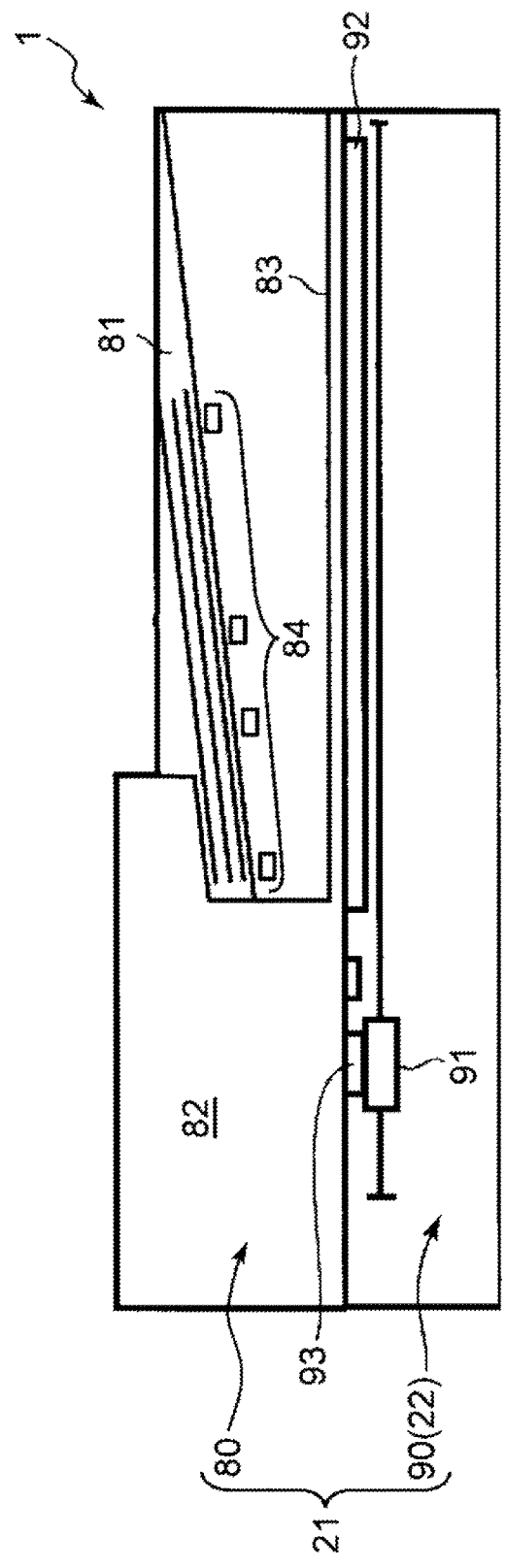
FIG. 2 illustrates a schematic configuration of a first document reading unit and a second document reading unit.

FIG. 2 illustrates a schematic configuration of the first document reading unit 21 and the second document reading unit 22. Specifically, as illustrated in FIG. 2, the first document reading unit 21 is constituted of a document feeding unit 80 located on the upper portion of the main body of the multi-functional peripheral 1 and a document reading unit 90. The second document reading unit 22 is constituted of the document reading unit 90.

The document feeding unit 80 includes a document placement table 81 for placing a document, a document conveying unit 82, a document discharging unit 83 for discharging a document, and a size detection sensor 84. The document conveying unit 82 conveys a document placed on the document placement table 81 up to the document discharging unit 83, via a reading slit 93.

The size detection sensor 84 detects the size of the document placed on the document placement table 81. For example, the size detection sensor 84 is constituted including a plurality of placement sensors arranged at a predetermined position in a bottom surface of the document placement table 81. The respective placement sensors detect whether or not a document is placed on itself. The size detection sensor 84 detects the size of the document based on the size of a region surrounded by the placement sensors that detect placement of the document. The method where the size detection sensor 84 detects the size of the document is not meant to be limited to this.

The document feeding unit 80 is rotatably constituted with one side of the backside of the paper in FIG. 2 as an axis, and thus rotation of the document feeding unit 80 enables placing a document on the top surface of the platen 92.

The document reading unit 90 includes a scanner unit 91, a platen 92 constituted of a transparent member such as glass, and the reading slit 93. The scanner unit 91 has a well-known configuration including an exposing lamp, a CCD, or similar light source, and is movably constituted by a driving unit (not illustrated). The scanner unit 91 reads the document placed on the platen 92 and the document passing through over the reading slit 93, and then generates the image data indicating the image of this document. The document reading unit 90 includes no sensor to detect the size of the document placed on the platen 92.

That is, after causing the scanner unit 91 to move up to the reading slit 93, the first document reading unit 21 causes the document conveying unit 82 to convey the document placed on the document placement table 81, and then causes the scanner unit 91 to read the document passing through over the reading slit 93. The first document reading unit 21 causes the size detection sensor 84 to detect the size of the document.

The first document reading unit 21 causes the scanner unit 91 to read the document from the time when the distal end of the document reaches over the reading slit 93 and until the time when the distal end of this document is conveyed by the length corresponding to the read size of the document, which is determined by a read size determination unit 12 (also referred to as a read size determination circuit) described later. This ensures that the first document reading unit 21 reads the document by this determined read size of the document and generates the image data indicating an identical size image as this read size.

On the other hand, while causing the scanner unit 91 to move along with a document placed on the platen 92, the second document reading unit 22 causes the scanner unit 91 to read this document placed on the platen 92. Because a sensor, which detects the size of the document placed on the platen 92, is not included, the second document reading unit 22 is constituted to be incapable of detecting the size of the document placed on the platen 92.

The second document reading unit 22 causes the scanner unit 91 to read the document while causing the scanner unit 91 to move from the distal end of the document placed on the platen 92 up to a distant position by a length corresponding to the read size of the document determined by the read size determination unit 12 described later. This ensures that the second document reading unit 22 reads the document by this determined read size of the document and generates the image data indicating the identical size image as this read size.

The image forming unit 30 has a well-known configuration including units such as a photoreceptor drum, a charging unit, an exposure unit, a developing unit, a transfer unit, a fixing unit, and a discharge unit. The image forming unit 30 executes a printing process forming images, which the image data generated by the first document reading unit 21 and the second document reading unit 22 and the image data received by the communication unit 50 represent, on a paper sheet.

The operation display 40 includes a display 41 such as a liquid crystal display, and an operation unit 42 (also referred to as an operation circuit). The operation unit 42 includes various kinds of operation keys such as numeric keypads for operating an input operation of a numerical value and a start key for operating an input operation of a start instruction of various kinds of jobs. The operation unit 42 includes a touch panel apparatus for performing a touch operation of a software key displayed on the display 41.

The communication unit 50 is a communication interface circuit used when communicating with an external unit via a network such as a local area network (LAN) or the Internet. The storage unit 60 is a storage device such as a hard disk drive (HDD) or a solid state drive (SSD). The storage unit 60 preliminarily stores various kinds of data required for operation of the multi-functional peripheral 1.

The control unit 10 includes a CPU (not illustrated) executing predetermined arithmetic processing, a non-volatile memory (not illustrated) such as an electrically erasable programmable read only memory (EEPROM) where predetermined control programs are stored, a random access memory (RAM) (not illustrated) for storing data temporarily, peripheral circuits for these, and similar circuit. The control unit 10 controls the operation of the respective units inside the multi-functional peripheral 1 by executing the control programs stored in the non-volatile memory by a central processing unit (CPU).

For example, the control unit 10 functions as a job execution unit 11 (an image output unit), the read size determination unit 12, and an initial size setting unit 13 in relation to the operation causing the first document reading unit 21 and the second document reading unit 22 to read a document.

The job execution unit 11 executes various kinds of jobs instructed by operation of the operation unit 42. The jobs include a scan job, a copy job, and similar job. The scan job is a job that creates an electronic file from the image data generated by the execution of a reading job of a document and then outputs. The reading job of a document is a job that causes the first document reading unit 21 or the second document reading unit 22 to read the document and to generate the image data indicating the image of the document. The copy job is a job that causes the image forming unit 30 to execute a printing process, which forms the image indicating the image data generated by the execution of the reading job on a paper sheet, and outputs the paper sheet with this image formed.

Figure 3:
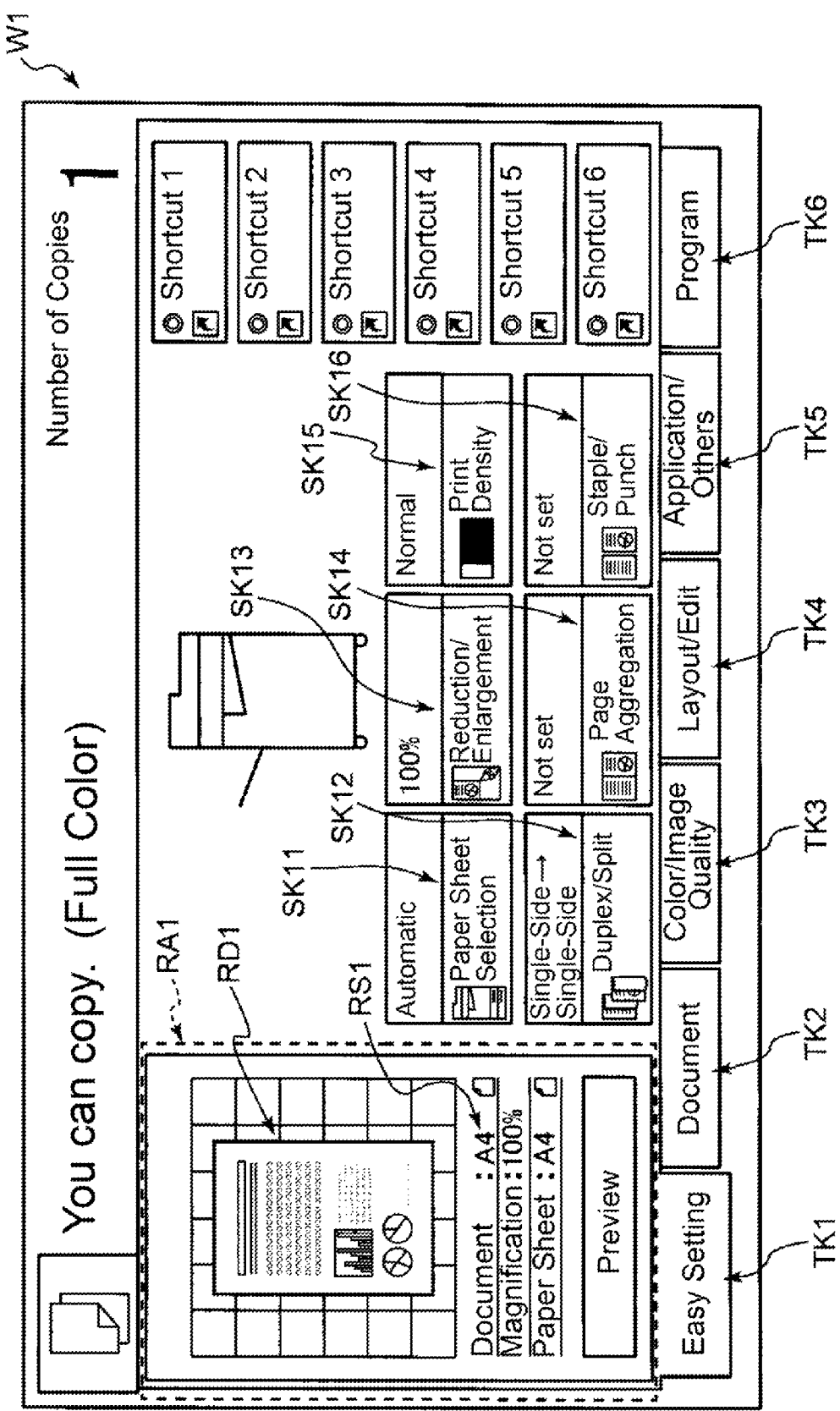
FIG. 3 illustrates an exemplary copy job setting screen.

FIG. 3 illustrates an exemplary copy job setting screen W1. For example, when a copy job key (not illustrated) located in the operation unit 42 is pressed, the job execution unit 11 displays the copy job setting screen W1 illustrated in FIG. 3 on the display 41.

As illustrated in FIG. 3, software keys SK11 to SK16 for setting six execution conditions (such as "paper sheet selection," "reduction/enlargement") of the copy job are located in the copy job setting screen W1. On the upper portion of the respective software keys SK11 to SK16, set values set by touch operation of the respective software keys SK11 to SK16 are displayed. In the copy job setting screen W1, tab keys TK1 to TK6 for entering a display instruction of the setting screen for the respective execution conditions are located. FIG. 3 illustrates an example where the copy job setting screen W1, which is the setting screen for the above-described six execution conditions, is displayed by the pressing of the tab key TK1.

Figure 4:
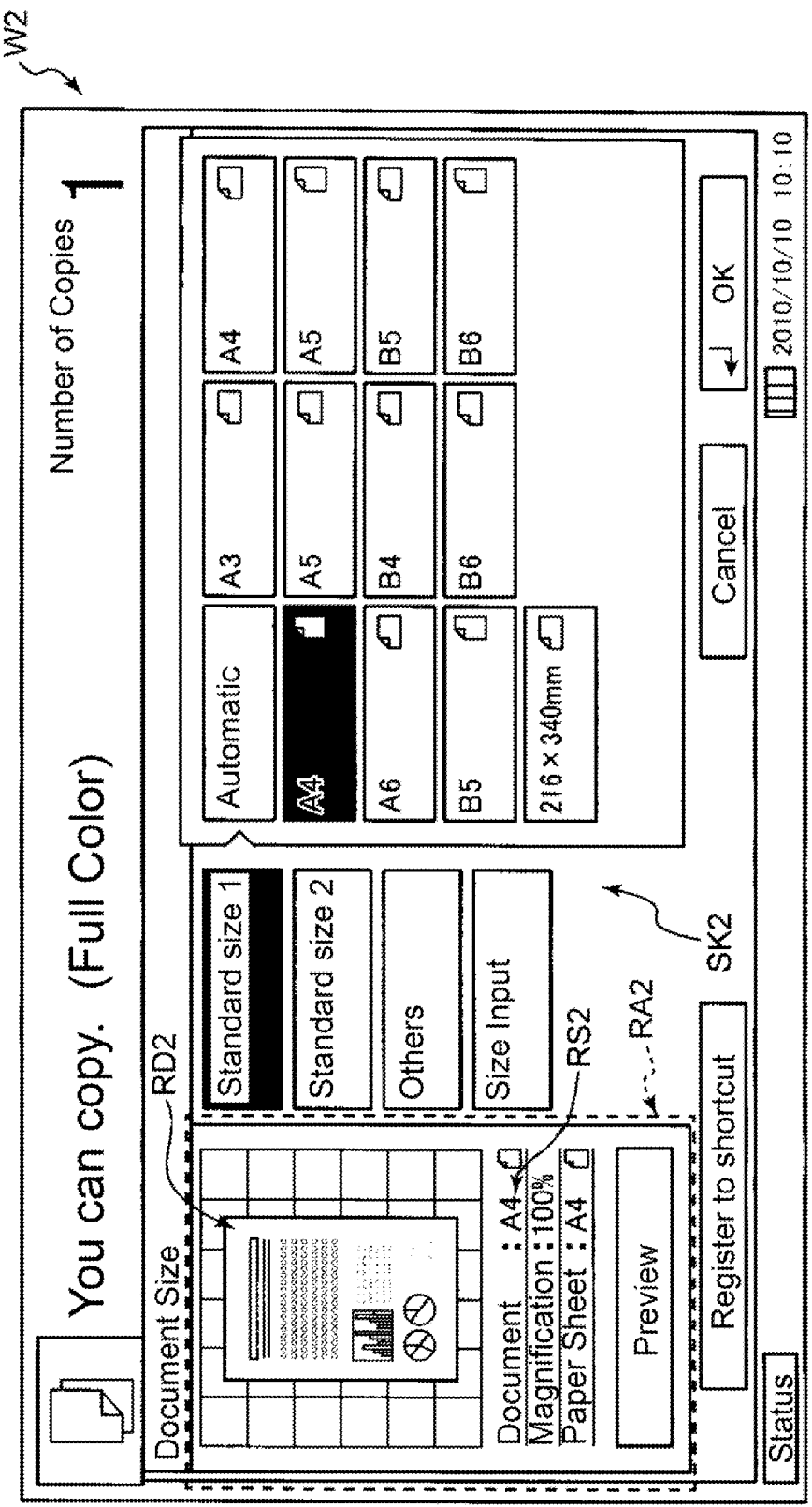
FIG. 4 illustrates an exemplary read size setting screen.

FIG. 4 illustrates an exemplary read size setting screen W2 (a setting screen). For example, the tab key TK2 is located for entering a display instruction of the read size setting screen W2 illustrated in FIG. 4. The read size setting screen W2 is the screen for when causing the first document reading unit 21 and the second document reading unit 22 to read the document (a first read size, a second read size). The setting of the read size is the execution condition of the reading job of the document that is included in the copy job.

As illustrated in FIG. 4, a plurality of software keys SK2, which indicate set values settable as the read size of the document, respectively, are located in the read size setting screen W2. When a user performs the touch operation to any of the software keys among the plurality of software keys SK2, the set value that the software key, to which the touch operation is performed, indicates is set as the read size of the document.

A display area RA2 is located in the read size setting screen W2. The display area RA2 has a display field RS2, a display field RD2, and similar field. The display field RS2 is a field for displaying the read size of the document that is set by the touch operation to any of the plurality of software keys SK2, and the display field RD2 is a field for displaying the image that represents this set read size of the document. FIG. 4 illustrates an example where the read size of the document is set to "A4" by performance of the touch operation to the software key indicating "A4."

Return to reference of FIG. 3. A display area RA1 is further located in the copy job setting screen W1. The display area RA1 has a display field RS1, a display field RD1, and similar field. The display field RS1 is a field for displaying the read size of the document determined by the read size determination unit 12 described below, and the display field RD1 is a field for displaying the image that represents this determined read size of the document. A display style of the display area RA1 will be described in detail later.

When a start key (not illustrated), which is located in the operation unit 42, for entering a start instruction of a job is pressed, the job execution unit 11 executes a copy job with the execution conditions set in the setting screen of the respective execution conditions corresponding to the tab keys TK1 to TK6.

The read size determination unit 12 sets any of an optional setting mode (a first mode) and an each time setting mode (a second mode), both of which specify a determination method of a read size of a document. Specifically, when a mode setting key (not illustrated) located in the operation unit 42 is pressed, the read size determination unit 12 displays a mode setting screen (not illustrated) including two software keys that indicate the optional setting mode and the each time setting mode in the display 41. Then, when a user performs the touch operation to any of these two software keys, the read size determination unit 12 sets the mode that this software key, to which the touch operation is performed, indicates.

Then, the read size determination unit 12 determines the read size of the document when causing the first document reading unit 21 and the second document reading unit 22 to read the document, by the determination method specified by this set mode. The operation, where the read size determination unit 12 determines the read size of the document by the determination method specified by the respective modes, will be described later.

The initial size setting unit 13 sets an initial size that is an initial value of the read size of the document, and stores this set initial size to the storage unit 60. Specifically, when a system menu key (not illustrated) located in the operation unit 42 is pressed at any time (in advance) when the multi-functional peripheral 1 is unused, the initial size setting unit 13 displays a system settings screen (not illustrated) in the display 41. Then, when the touch operation to an initial size setting key (not illustrated) inside the system settings screen is performed, the initial size setting unit 13 displays an initial size setting screen, which is an identical configuration as the read size setting screen W2 illustrated in FIG. 4 in the display 41. Subsequently, when the touch operation to any software key included in the initial size setting screen is performed, the initial size setting unit 13 sets the set value, which this software key, to which the touch operation is performed, indicates, as the initial size, and stores this set initial size to the storage unit 60.

Figure 5:
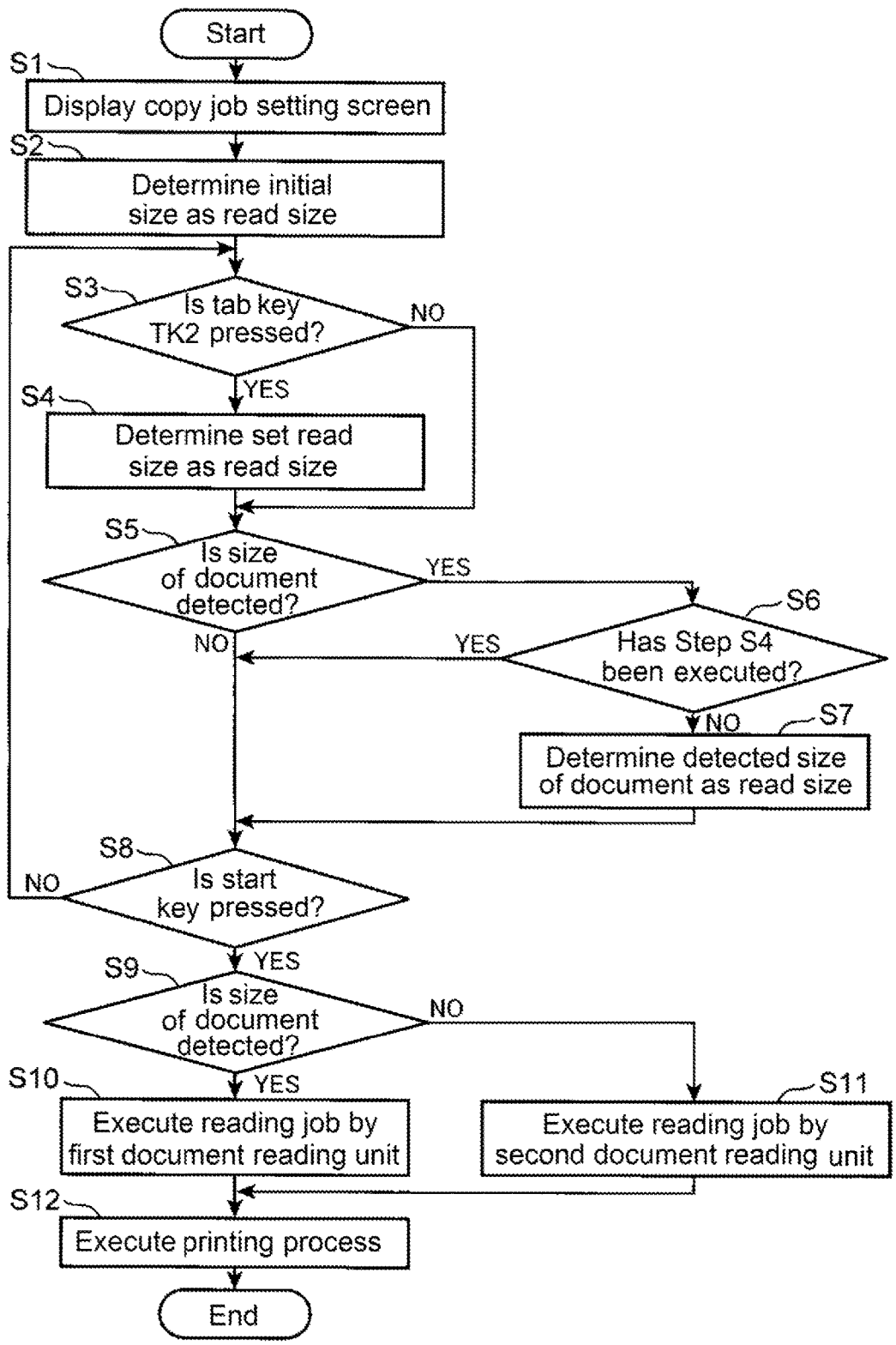
FIG. 5 illustrates operations executing a copy job when an optional setting mode is set.

The following firstly describes an operation of execution of a copy job when the optional setting mode is set. In this description, a description will be given of the operation where the read size determination unit 12 determines the read size of the document by the determination method specified by the optional setting mode. FIG. 5 illustrates the operation of the execution of the copy job when the optional setting mode is set.

Assume that, after the optional setting mode is set by the read size determination unit 12, a copy job key (not illustrated) located in the operation unit 42 is pressed. In this case, as illustrated in FIG. 5, the job execution unit displays the copy job setting screen W1 (FIG. 3) in the display 41 (Step S1).

After Step S1, the read size determination unit 12 first determines the initial size, which is preliminarily stored in the storage unit 60, as the read size of the document (Step S2). When the read size determination unit 12 determines the read size of the document at Step S2 and the steps described below, the read size determination unit 12 displays this determined read size of the document in the display field RS1 inside the display area RA1 of the copy job setting screen W1. The read size determination unit 12 displays the image representing this determined read size of the document in the display field RD1. The aspect, where the read size determination unit 12 displays the read size of the document determined at each step in the display fields RS1 and RD1 inside the display area RA1, will be described later.

After Step S2, when the tab key TK2 is pressed (YES at Step S3), the read size determination unit 12 displays the read size setting screen W2 in the display 41. Then, the read size determination unit 12 determines this read size of the document set in the read size setting screen W2 as the read size of the document (Step S4). When the tab key TK2 has not been pressed (NO at Step S3), Step S4 is not executed.

Subsequently, assume that the document has been placed on the document placement table 81, and the size detection sensor 84 has detected the size of the document (YES at Step S5). In this case, when the read size determination unit 12 has not executed Step S4 and has not determined the read size of the document, which was to be set in the read size setting screen W2, as the read size of the document (NO at Step S6), the read size determination unit 12 determines the size of the document that has been detected at Step S5 as the read size of the document (Step S7).

On the other hand, even when the size of the document has been detected (YES at Step S5), when the read size determination unit 12 has executed Step S4, and has determined the read size of the document, which has been set in the read size setting screen W2, as the read size of the document (YES at Step S6), the read size determination unit 12 will not execute Step S7.

The processes after Step S3 are repeated until the start key is pressed (NO at Step S8). Subsequently, assume that the start key has been pressed (YES at Step S8). In this case, when the size detection sensor 84 has detected the size of the document (YES at Step S9), the job execution unit 11 executes the reading job of the document included in the copy job using the first document reading unit 21. That is, the job execution unit 11 causes the first document reading unit 21 to read the document by the read size (a first read size) of the document determined by any of three Steps S2, S4, and S7 (Step S10).

On the other hand, assume that the size detection sensor 84 has not detected the size of the document (NO at Step S9) when the start key has been pressed (YES at Step S8). In this case, because it is considered that the document is placed not on the document placement table 81 but on the platen 92, the job execution unit 11 executes the reading job of the document included in the copy job using the second document reading unit 22. That is, because the size of the document has not been detected (NO at Step S5), and Step S7 has not been executed, the job execution unit 11 causes the second document reading unit 22 to read the document by the read size (a second read size) of the document determined by any of two Steps S2 and S4 (Step S11).

Then, when the image data is generated by the execution of the reading job of the document at Step S10 or Step S11, the job execution unit 11 causes the image forming unit 30 to execute the printing process forming the image indicated by this image data on a paper sheet (Step S12).

Figure 6:
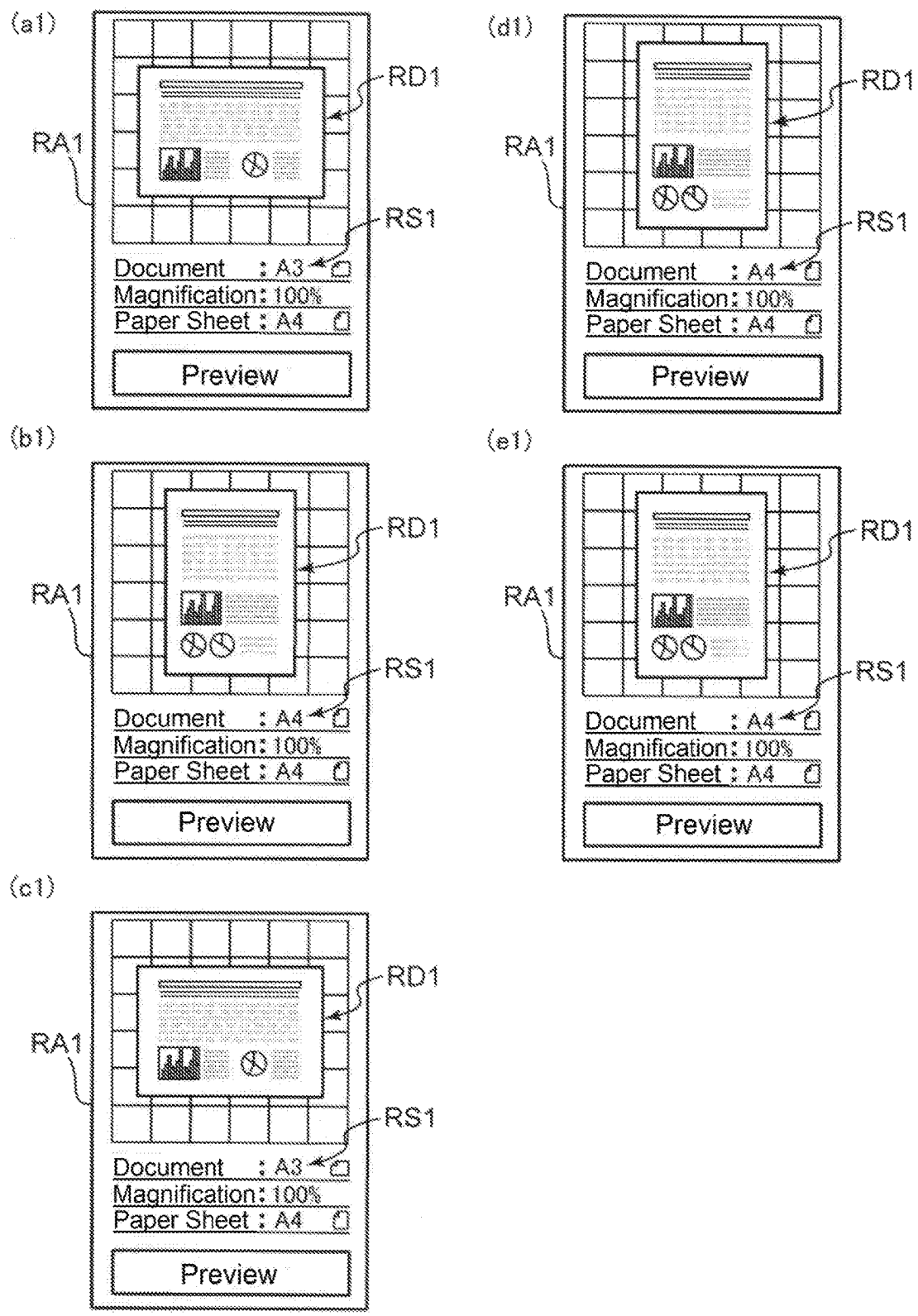
FIG. 6 illustrates an exemplary display style of a display area located in the copy job setting screen when the optional setting mode is set.

Next, a description will be given of display styles (a1) to (e1) in the display area RA1 located in the copy job setting screen W1 when the optional setting mode is set. FIG. 6 illustrates one example of the display styles (a1) to (e1) in the display area RA1 located in the copy job setting screen W1 when the optional setting mode is set.

(a1): assume that an initial size "A3" is preliminarily stored in the storage unit 60. In this case, the read size determination unit 12 determines the initial size "A3" as the read size of the document at Step S2. Then, the read size determination unit 12 displays this determined read size "A3" of the document in the display field RS1 and the image representing "A3" in the display field RD1, as illustrated in (a1) of FIG. 6.

(b1): after (a1), assume that the tab key TK2 is not pressed (NO at Step S3), and the size "A4" of the document has been detected (YES at Step S5). In this case, at Step S7, the read size determination unit 12 determines the size "A4" of the document that has been detected at Step S5 as the read size of the document. Then, the read size determination unit 12 displays the determined read size "A4" of the document in the display field RS1 and displays the image representing "A4" in the display field RD1, as illustrated in (b1) of FIG. 6.

(c1): after (a1), assume that the tab key TK2 is not pressed (NO at Step S3), and the document of the size "A4" has been placed on the platen 92. In this case, the read size determination unit 12 will not execute Step S7 because the size "A4" of the document is not detected (NO at Step S5). As a result, the display style in the display area RA1 will not be changed at all from the display style illustrated in (a1) of FIG. 6, as illustrated in (c1) of FIG. 6.

(d1): after (a1), assume that the tab key TK2 has been pressed (YES at Step S3), and the read size "A4" of the document has been set in the read size setting screen W2. In this case, the read size determination unit 12 determines the read size "A4" of the document set in the read size setting screen W2 as the read size of the document, at Step S4. Then, the read size determination unit 12 displays this determined read size "A4" of the document in the display field RS1 and displays the image representing "A4" in the display field RD1, as illustrated in (d1) of FIG. 6.

(e1): after (d1), assume that until after the start key has been pressed (NO at Step S8), the size "A3" of the document has been detected (YES at Step S5). In this case, the read size determination unit 12 does not execute Step S7 because Step S4 has already been executed, and does not change the read size of the document determined at Step S4 to this size "A3" of the document detected at Step S5. As a result, the display style of the display area RA1 will not be changed at all from the display style illustrated in (d1) of FIG. 6, as illustrated in (e1) of FIG. 6.

Figure 7:
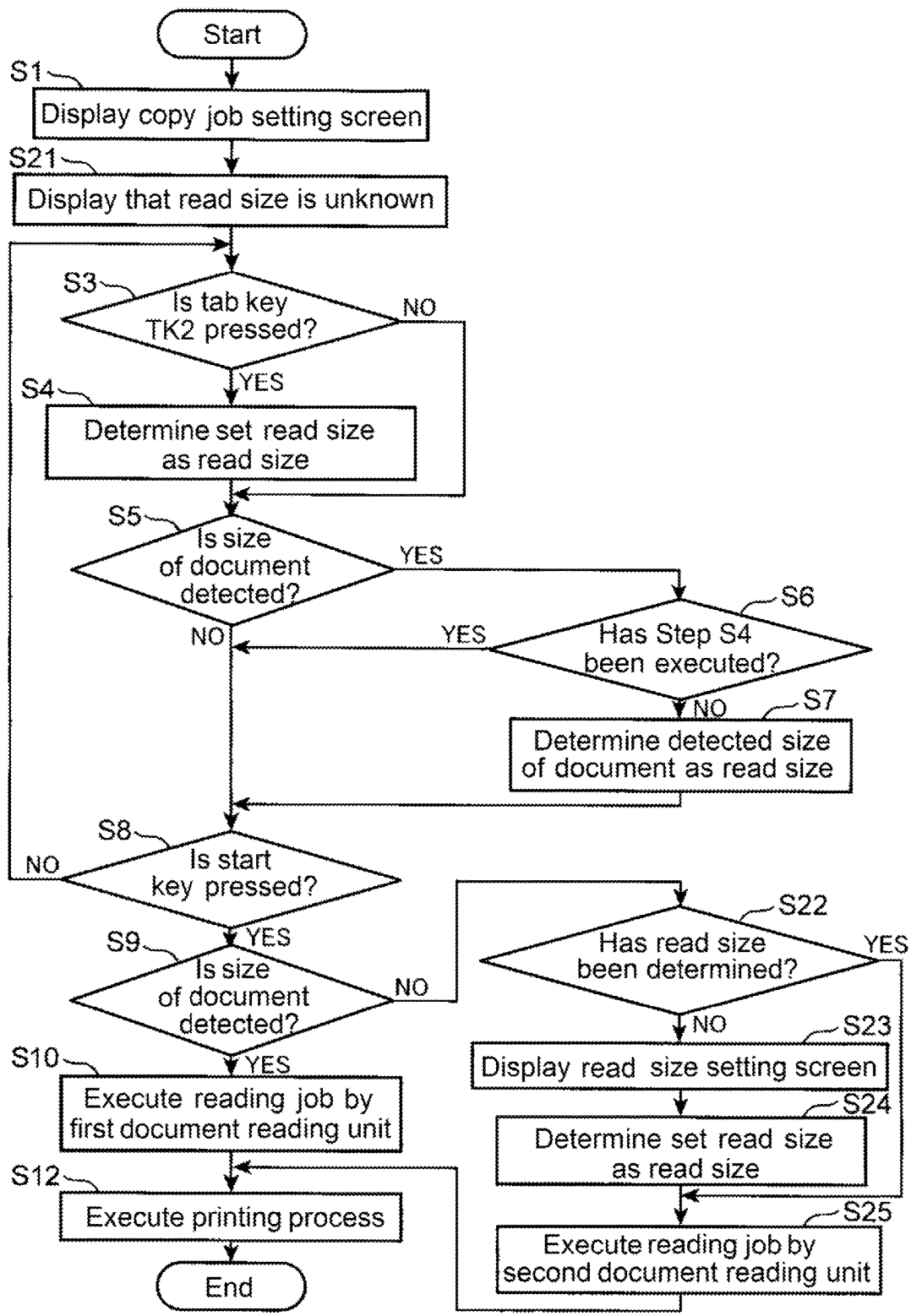
FIG. 7 illustrates operations executing a copy job when an each time setting mode is set.

Next, the following describes an operation of execution of a copy job when the each time setting mode is set. In this description, a description will be given of an operation where the read size determination unit 12 determines the read size of the document by the determination method specified by the each time setting mode. FIG. 7 illustrates the operation of the execution of the copy job when the each time setting mode is set. In FIG. 7, with respect to the steps with an identical processing item as the steps when the optional setting mode is set, like reference numerals used in FIG. 5 designate corresponding or identical steps throughout FIG. 7, and thus the description for these steps will be omitted.

As illustrated in FIG. 7, when the each time setting mode is set, because the read size of the document is not determined after Step S1, the read size determination unit 12 displays information indicating that the read size of the document is unknown in the display fields RS1 and RD1 inside the display area RA1 of the copy job setting screen W1 (FIG. 3) (Step S21). The display style of the display area RA1 when the each time setting mode is set will be described later.

After Step S21, before the start key is pressed (NO at Step S8), the processes after Step S3 are repeated similar to the operation illustrated in FIG. 5. Subsequently, assume that the start key is pressed (YES at Step S8). In this case, when the size detection sensor 84 has detected the size of the document (YES at Step S9), the processes after Step S10 are executed, similarly to the operations illustrated in FIG. 5.

On the other hand, assume that the size detection sensor 84 has not detected the size of the document (NO at Step S9) when the start key is pressed (YES at Step S8). In this case, the read size determination unit 12 determines whether or not the read size of the document is determined (Step S22).

When Step S22 is performed, the size of the document has not been detected (NO at Step S5), and Step S7 has not been executed. In view of this, at Step S22, the read size determination unit 12 determines whether or not the read size of the document is determined by determining whether or not Step S4 has already been executed.

When the read size determination unit 12 determines that the read size of the document is not determined at Step S22 (NO at Step S22), the read size determination unit 12 displays the read size setting screen W2 in the display 41, and determines the read size of the document set in this read size setting screen W2 as the read size of the document (Step S24). On the other hand, when the read size determination unit 12 determines that the read size of the document is determined at Step S22 (YES at Step S22), the read size determination unit 12 will not execute Steps S23 and S24.

Subsequently, the job execution unit 11 causes the second document reading unit 22 to read the document (Step S25) by the read size (a second read size) of the document, which has been determined at any of Steps S4 and S24, and then executes Step S12.

Figure 8:
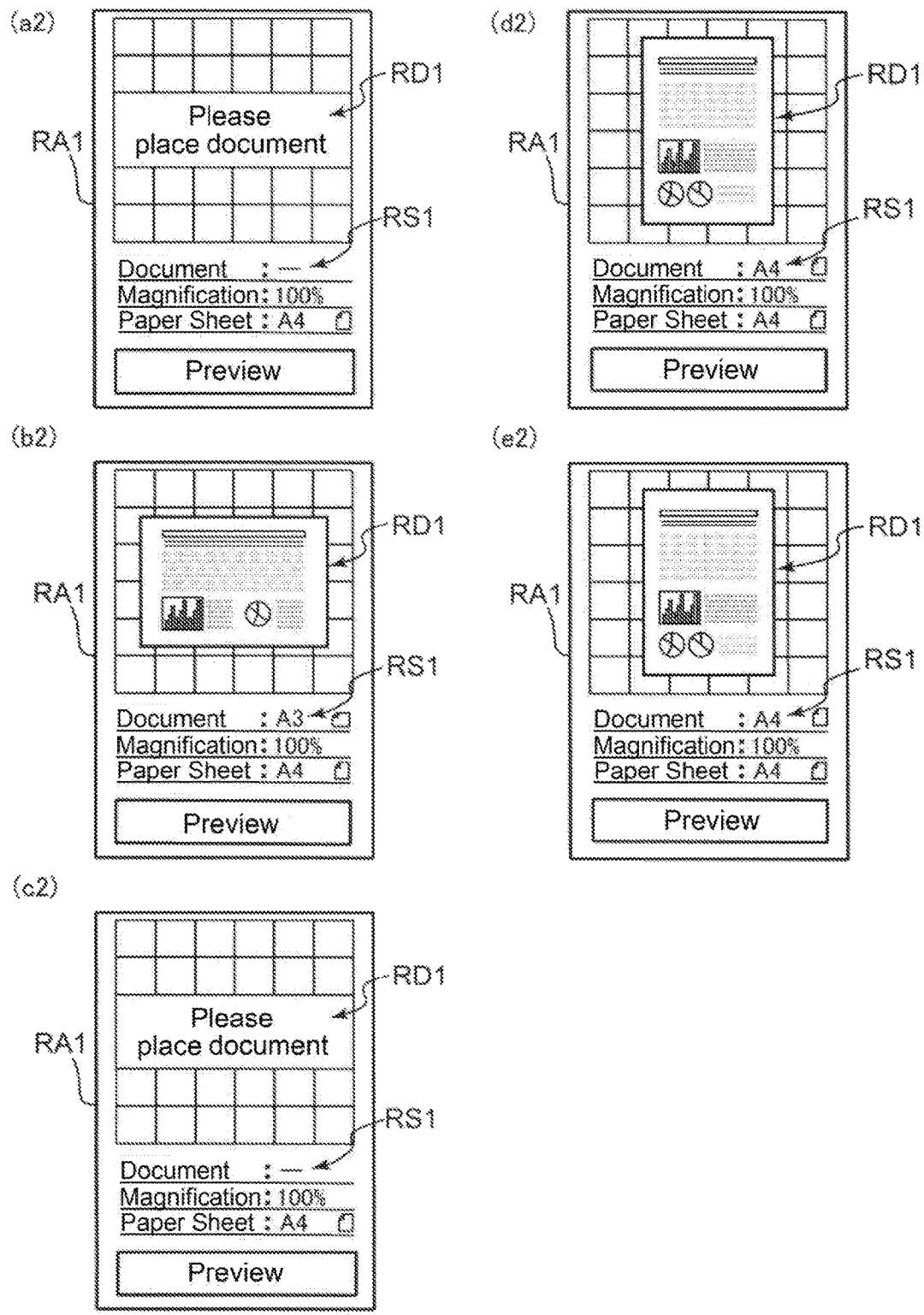
FIG. 8 illustrates an exemplary display style of a display area located in the copy job setting screen when the each time setting mode is set.

Next, a description will be given of the display styles (a2) to (e2) in the display area RA1 located in the copy job setting screen W1 when the each time setting mode is set. FIG. 8 illustrates one example of the display styles (a2) to (e2) in the display area RA1 located in the copy job setting screen W1 when the each time setting mode is set.

(a2): when each time setting mode is set, the read size determination unit 12 displays a character string "- -" as information that indicates that the read size of the document is unknown in the display field RS1 at Step S21, as illustrated in (a2) of FIG. 8. The read size determination unit 12 displays the image that represents a character string "please set a document" in the display field RD1 as the image that indicates that the read size of the document is unknown.

(b2): after (a2), assume that the tab key TK2 is not pressed (NO at Step S3), and the size "A3" of the document has been detected (YES at Step S5). In this case, the read size determination unit 12 determines the size "A3" of the document that has been detected at Step S5 as the read size of the document at Step S7. Then, as illustrated in (b2) of FIG. 8, the read size determination unit 12 displays the determined read size "A3" of the document in the display field RS1 and displays the image representing "A3" in the display field RD1.

(c2): after (a2), assume that the tab key TK2 is not pressed (NO at Step S3), and the document of the size "A4" is placed on the platen 92. In this case, the read size determination unit 12 will not execute Step S7 because the size "A4" of the document is not detected (NO at Step S5). As a result, as illustrated in (c2) of FIG. 8, the display style of the display area RA1 is not changed at all from the display style illustrated in (a2) of FIG. 8.

(d2): after (a2), assume that the tab key TK2 has been pressed (YES at Step S3), and the read size "A4" of the document has been set in the read size setting screen W2. In this case, the read size determination unit 12 determines the read size "A4" of the document set in the read size setting screen W2 as the read size of the document at Step S4. Then, as illustrated in (d2) of FIG. 8, the read size determination unit 12 displays this determined read size "A4" of the document in the display field RS1 and displays the image representing "A4" in the display field RD1.

(e2): after (d2), assume that until after the start key has been pressed (NO at Step S8), the size "A3" of the document has been detected (YES at Step S5). In this case, the read size determination unit 12 does not execute Step S7 because Step S4 has already been executed, and does not change the read size of the document determined at Step S4 to this size "A3" of the document detected at Step S5. As a result, the display style of the display area RA1 is not changed at all from the display style illustrated in (d2) of FIG. 8, as illustrated in (e2) of FIG. 8.

Thus, according to the configuration of the embodiment described above, when the optional setting mode is set, the read size determination unit 12 displays the initial size, which is the read size of the document set in advance, in the display 41 before the size of the document is detected by the first document reading unit 21 (Step S2). This ensures that a user understands the initial size, which is the read size of the document set in advance, before causing the first document reading unit 21 to read the document.

Even when any of the optional setting mode and the each time setting mode is set, the read size determination unit 12 displays the read size setting screen W2 in the display 41 when the tab key TK2 is pressed (YES at Step S3). Then, the read size determination unit 12 determines the read size of the document set in this setting screen as the read size of the document when causing the first document reading unit 21 and the second document reading unit 22 to read the document at Step S10 and Step S11 (Step S4).

This ensures that a user and an administrator cause the read size setting screen W2 to be displayed by pressing the tab key TK2 and set the intended read size of the document by this read size setting screen W2, even when any of the optional setting mode and the each time setting mode is set. This ensures that the user and the administrator determines the read size of the document when causing the first document reading unit 21 and the second document reading unit 22 to read the document at Step S10 and Step S11 to this intended read size.

Even when any of the optional setting mode and the each time setting mode is set, after determining the read size of the document set in the read size setting screen W2 as the read size of the document at Step S4, the read size determination unit 12 does not determine the size of the document detected at Step S5 as the read size of the document (YES at Step S5, YES at Step S6).

This ensures that the intended read size of the document set in the read size setting screen W2 by the user and the administrator is made a higher priority than the size of the document detected by the size detection sensor 84, and is determined as the read size of the document when causing the first document reading unit 21 to read the document. This ensures that the user and the administrator cause the first document reading unit 21 to read the document by the intended read size.

When the each time setting mode is set, the read size determination unit 12 displays the information that indicates that the read size of the document is unknown in the display 41 when the read size of the document is not determined (Step S21).

Thus, when the each time setting mode is set, the user easily becomes aware that the read size of the document is unknown. This ensures that this user quickly performs the operation for determining the read size of the document, such as placing the document on the document placement table 81 to cause the size detection sensor 84 to detect the size of the document, or setting the read size of the document after causing the read size setting screen W2 to be displayed by pressing the start key.

When the each time setting mode is set, the read size determination unit 12 does not display the read size setting screen W2 in the display 41 when the read size of the document has already been determined when the start key is entered (YES at Step S8, YES at Step S22).

Thus, when the read size of the document has already been determined, the reading job of the document by the second document reading unit 22 can be quickly started by the read size of the document, which has already been determined, by omitting the display of the read size setting screen W2.

The embodiments described above are merely exemplary embodiments according to the disclosure, and it is not intended to limit the disclosure to the embodiments described above. For example, the following modified embodiments may be possible.

(1) When the each time setting mode is set, regardless of whether or not the read size of the document is determined, the processes after Step S23 (FIG. 7) may be performed by omitting Step S22 (FIG. 7).

(2) When the each time setting mode is set, by omitting Step S21 (FIG. 7) and in accordance with this, information and an image may not be displayed at all in the display fields RS1 and RD1.

(3) Even when any of the optional setting mode and each time setting mode is set, by omitting the determination process at Step S6 (FIG. 5, FIG. 7), Step S7 (FIG. 5, FIG. 7) may be performed regardless of whether or not Step S4 is executed.

(4) Even when any of the optional setting mode and the each time setting mode is set, Step S3 and Step S4 (FIG. 5, FIG. 7) may be omitted.

(5) When the optional setting mode is set, in Step S2 (FIG. 5), information and an image may not be displayed at all in the display fields RS1 and RD1 inside the display area RA1 when the initial size is determined as the read size of the document.

In any of the embodiments described above, regardless of whether the optional setting mode is set or the each time setting mode is set, the size of the document detected by the size detection sensor 84 can be determined as the read size of the document when causing the first document reading unit 21 to read the document at Step S10 (YES at Step S5, Step S7).

Even when any of the optional setting mode and each time setting mode is set, this ensures causing the first document reading unit 21 to read the document appropriately by an identical size as the size of the document detected by the size detection sensor 84.

When the optional setting mode is set, the initial size set in advance can be determined as the read size of the document when causing the second document reading unit 22 to read the document (Step S2). This ensures that, by setting the intended read size of the document as the initial size in advance, the administrator can cause the second document reading unit 22 to read the document by this intended read size.

On the other hand, when the each time setting mode is set, and causing the second document reading unit 22 to read the document, by displaying the read size setting screen W2 in the display 41 when the start key is pressed, the read size of the document set in this read size setting screen W2 can be determined as the read size of the document (Steps S23, S24). This ensures that the user sets the intended read size with the read size setting screen W2, which has been displayed when the start key was pressed, and causes the second document reading unit 22 to read the document by this intended read size.

(6) A sensor that is similar to the size detection sensor 84 and detects the size of the document placed on the platen 92 may be located in the document reading unit 90 without locating the size detection sensor 84 in the document feeding unit 80. In accordance with this, the first document reading unit according to the disclosure may be constituted by this document reading unit 90, and the second document reading unit according to the disclosure may be constituted by this document feeding unit 80 and this document reading unit 90.

(7) Although Steps S5 and S9 (FIG. 5, FIG. 7) determines whether or not the size detection sensor 84 detects the size of the document, alternatively, by separately locating a document set sensor, which detects whether or not the document is placed on the document placement table 81, Steps S5 and S9 (FIG. 5, FIG. 7) may determine whether or not this document set sensor detects the document.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus, comprising:
a display;
an operation circuit;
a storage;
a platen;
a scanner beneath the platen;
a document placement table;
a size detection sensor beneath the document placement table;
a document conveying unit for conveying onto the platen a document placed on the document placement table; wherein
the document placement table, the size detection sensor, the document conveying unit, the scanner, and the platen constitute a first-mode document reading arrangement for detecting size of a document placed on the document placement table, and
the scanner and the platen constitute a second-mode document reading arrangement not configured to detect document size; and
control circuitry configured as
a read size determination circuit functioning to set the image reading apparatus into a first mode in which the first-mode document reading arrangement operates, and a second mode in which the second-mode document reading arrangement operates, and
an initial size setting circuit for setting, via the operation circuit, an initial size being an initial value for the read size of a document, and storing the set initial size in the storage; wherein
in the first mode, the read size determination circuit establishes the size of a document detected by the first-mode document reading arrangement as a first read size, and establishes a read size of a document set in advance by the initial size setting circuit as a second read size, the first read size being the read size of a document when the first-mode document reading arrangement reads the document, the second read size being the read size of a document when the second-mode document reading arrangement reads the document, and
in the second mode, the read size determination circuit establishes the size of a document detected by the first-mode document reading arrangement as the first read size, and if the second-mode document reading arrangement reads the document, the control circuitry displays on the display a setting screen for the read size of the document, and establishes the read size of the document set in the setting screen as the second read size when a start instruction for a document reading job is entered through the operation circuit.

2. The image reading apparatus according to claim 1, wherein in the first mode the control circuitry displays on the display the read size of a document set in advance by the initial size setting circuit before the size of the document is detected by the first-mode document reading arrangement.

3. The image reading apparatus according to claim 1, wherein when display instructions on the setting screen are entered through the operation circuit, in the first mode and the second mode the control circuitry displays the setting screen on the display, and establishes a document read size set through the setting screen as the first read size and the second read size.

4. The image reading apparatus according to claim 3, wherein in the first mode and the second mode, after establishing a document read size set through the setting screen as the first read size, the control circuitry does not establish the size of a document detected by the first-mode document reading arrangement as the first read size.

5. The image reading apparatus according to claim 1, wherein in the second mode, when the first read size and the second read size are not established, the control circuitry displays on the display information indicating that the document read size is unknown.

6. The image reading apparatus according to claim 1, wherein in the second mode the control circuitry does not display the setting screen on the display if the second read size has already been determined when the start instruction for a reading job is entered.

7. An image processing apparatus, comprising:
   the image reading apparatus according to claim 1; and
   an image forming unit that executes printing processes to output an image read by either the first-mode document reading arrangement or the second-mode document reading arrangement.

* * * * *